(12) United States Patent
Wulfekuhle

(10) Patent No.: US 9,403,729 B1
(45) Date of Patent: Aug. 2, 2016

(54) COMPOSITION AND METHOD FOR PELLETIZED COMPOST

(71) Applicant: Ultra Compost, Inc., New Vienna, IA (US)

(72) Inventor: Lee Wulfekuhle, New Vienna, IA (US)

(73) Assignee: Ultra Compost, Inc., New Vienna, IA (US)

(*) Notice: Subject to any disclaimer, the term of this patent is extended or adjusted under 35 U.S.C. 154(b) by 0 days.

(21) Appl. No.: 14/573,046

(22) Filed: Dec. 17, 2014

(51) Int. Cl.
| | | |
|---|---|---|
| C05F 11/08 | (2006.01) | |
| C05F 17/00 | (2006.01) | |
| C05D 1/02 | (2006.01) | |
| C05B 17/00 | (2006.01) | |
| C05G 3/00 | (2006.01) | |

(52) U.S. Cl.
CPC ............... C05B 17/00 (2013.01); C05F 11/08 (2013.01); C05F 17/00 (2013.01); C05G 3/0058 (2013.01); C05D 1/02 (2013.01)

(58) Field of Classification Search
None
See application file for complete search history.

(56) References Cited

U.S. PATENT DOCUMENTS

| | | | |
|---|---|---|---|
| 5,810,903 A * | 9/1998 | Branconnier | C05F 17/0018 210/606 |
| 6,174,472 B1 | 1/2001 | Johnson et al. | |
| 6,517,600 B1 | 2/2003 | Dinel | |
| 6,916,426 B2 * | 7/2005 | Van Slyke | C02F 9/00 210/666 |
| 8,216,336 B2 * | 7/2012 | Blandy | A01C 3/025 60/783 |
| 2004/0032032 A1 * | 2/2004 | Erickson | B01F 3/04539 261/93 |
| 2005/0183483 A1 * | 8/2005 | Ambrose | C05F 17/0229 71/6 |
| 2005/0235716 A1 * | 10/2005 | Devine | C05F 17/00 71/6 |
| 2011/0179841 A1 * | 7/2011 | Lu | C05F 7/00 71/12 |
| 2011/0247378 A1 * | 10/2011 | Begley | C05G 1/00 71/8 |

FOREIGN PATENT DOCUMENTS

JP  2012-214344 A  * 11/2012

* cited by examiner

*Primary Examiner* — Wayne Langel
(74) *Attorney, Agent, or Firm* — Brett D. Papendick; Shuttleworth & Ingersoll, PLC

(57) ABSTRACT

A compost that has been previously cured is subjected to a variety of processes and additional components to result in a pelletized form suitable for commercial and residential applications. A phosphorous component, a potassium component, a lime component, and a plant growth component are added to the fully cured compost to produce a secondary compost. The secondary compost is treated with microwaves to adjust the ration of aerobic to anaerobic bacteria.

16 Claims, 1 Drawing Sheet

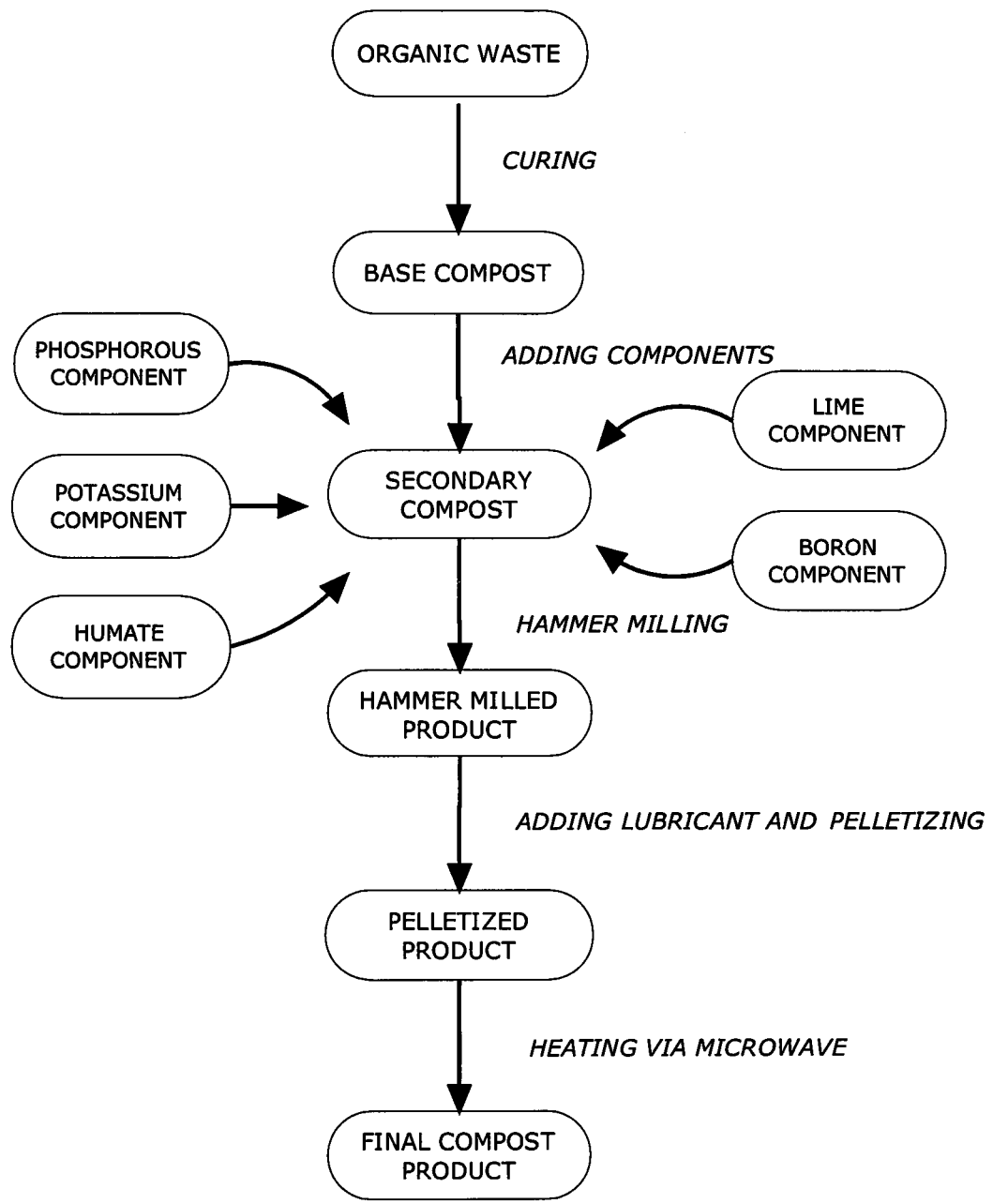

COMPOSITION AND METHOD FOR PELLETIZED COMPOST

BACKGROUND

Compost is nutrient-rich organic matter that is utilized as a soil additive to promote the growth of plants. The compost can be made of several base organic materials such as leaves, grass clippings, food waste, etc. and can use a combination of organic elements. In the composting process, the original organic material is decomposed and cured for a period of time. As the decomposition process relies on chemical reactions, the base organic material along with other reagents will determine the type of compost ultimately produced by the process and its effectiveness as a soil additive.

Determining the reagents and conditions is critical in producing an effective compost. Due to the ever growing trend of recycling waste products, including organic waste products, the industries associated with waste products have discovered additional markets for specific wastes and treatment of those wastes.

It is an object of the invention to produce a compost that has underwent a cooking process.

It is also an object of the invention to provide a process to pelletize the compost.

SUMMARY OF THE INVENTION

A compost that has been previously cured is subjected to a variety of processes and additional components to result in a pelletized form suitable for commercial and residential applications. A phosphorous component, a potassium component, a lime component, and a plant growth component are added to the fully cured compost. After mixing the additional components, the compost is subjected to a hammer mill and a pellet mill prior to entering a microwave oven.

BRIEF DESCRIPTION OF THE DRAWINGS

FIG. 1 is a flow chart showing the preferred order of the steps of the process.

DETAILED DESCRIPTION

Now referring to the drawings, FIG. 1 shows the preferred order of steps for producing a compost in pelletized form. An organic waste is chosen which can be food waste, cellulose waste, and/or any organic waste. The organic waste is appropriately cured and dried which may be done by placing the organic waste on the ground. In order to assist with the curing and drying process, the organic waste can be selectively agitated. The cured organic waste is now referred to as a base compost. Once the organic waste has achieved a selected moisture content and/or cured to a selected criteria, other ingredients are added to the base compost.

A lime component, a phosphorous component, a potassium component, a boron component, and a humate component are added to the base compost to form a secondary compost. After mixing, the secondary compost is hammer milled to make a uniform size. An oil is added to the hammer milled product prior to said product entering a pellet mill. The oil serves as a lubricant and binder in the pelletization of the hammer milled product. After the material has become pelletized, the pelletized mixture is heated and then bagged to form a final compost product.

Although certain products could potentially be left out and/or substituted for, the following is the preferred method for producing the final compost product. The preferred process and composition begin with a food waste organic product that is solar dried and cured to form the base compost. The moisture content of the base compost is approximately 25% after the solar drying and prior to the addition of the components used to make the secondary compost.

The lime component is preferably approximately 20% moisture and has a relatively high calcium content of approximately 1520-1570 effective calcium carbonate equivalent or ECCE value. The lime component assists in adjusting the pH of the final compost, typically raising the pH. Additionally, the lime component includes iron.

The phosphorous component in the preferred embodiment is soft rock phosphate which is a naturally occurring combination of phosphorous, calcium and trace minerals. In the preferred embodiment the soft rock phosphate utilized is calphos that is surface mined out of the state of Florida. Calphos is a colloidal phosphate found in a clay material. The natural phosphate material is approximately 18% phosphorous and 15% calcium.

The potassium component in the preferred embodiment is sulfate of potash also known as "0-0-50" and/or potassium sulfate. Typically, the sulfate of potash has an equivalent potassium content of approximately 50% potassium oxide and approximately 18% sulfate. As sulfate of potash has a low-chloride content it does not have the negative effects associated with potassium chloride. The beneficial effects of sulfate of potash include assisting plants resist disease and pests.

The boron component in the preferred embodiment is simply a boron product such as Fertibor which is approximately 15% Boron. Boron serves as a binder in the final compost product and allows plants to uptake nutrients and acts as a catalyst for mineralization. Boron is critical for the process of cell differentiation at all growing tips of plants where cell division is active.

The humate component in the preferred embodiment is a composition containing approximately 70% humic acid by weight. Humates are the decayed remains of plants that existed millions of years ago and can be found in the southwestern United States. Humates' benefits include increased crop yield, nutrient uptake, water retention and root growth. The addition of the humate component completes the secondary compost. The percentage of the components by weight in the preferred embodiment of the secondary compost are: 1) compost 50-70%; 2) lime component 15-25%; 3) phosphorous component 5-15%; 4) the potassium component 5-15%; 5) boron component 0.5-2%; 6) humate component 0.5-2%. The optimum components and percentages by weight are: 1) compost 60%; 2) lime component at 18% which is lime having an effective calcium carbonate equivalent between 1520-1570; 3) phosphorous component is 10% and is calphos; 4) potassium component is 10% and is 0-0-50; 5) boron component is 1% and is Fertibor; and 5) humate component is 1% and is from the southwestern United States.

The secondary compost is then thoroughly mixed which can be through a variety of methods, however, a ribbon mixer is utilized in the preferred method. The mixed secondary compost is then subjected to forces which crush the secondary compost into smaller pieces. Again, there are a variety of methods and devices to achieve the smaller pieces, however, a hammer mill utilizing a quarter inch screen is the preferred device and method to achieve a flour-like consistency of the secondary compost.

Next, a lubricant is added to the hammer milled compost product. Although a variety of lubricants can be used, an organic oil is utilized in the embodiments. In the preferred embodiment, vegetable oil is added to the hammer milled compost product as the hammer milled compost product is fed into a vertical ring die pellet mill. The preferred embodiment uses approximately twelve gallons of vegetable oil per one ton of secondary compost. Utilizing a waste oil, for example from a fast food restaurant, assists in mitigating odor issues of the final compost product.

The pellets exit the pellet mill onto a conveyor and put through a heating and sanitizing step. In the preferred embodiment, the pellets are subjected to a microwave oven. The microwave reduces moisture and reduces anerobic bacteria while leaving the majority of aerobic bacteria in the final compost product. In the preferred embodiment, the friction created in the pellet mill leads to product leaving the pellet mill at approximately 150-170 degrees Fahrenheit as it falls on the conveyor. The microwave is of a power and length to raise the temperature of the milled product to approximately 180-205 degrees, with the ideal temperature approximately 190 degrees. The pellets are then bagged and cooled. The pellets are preferably 2.5 mm pellets with a moisture content of 4-10% by weight.

Another embodiment utilizes an additional component in the secondary compost. The additional component is a mixture of top soil and particles of agricultural product referred to as ash. The ash is typically taken from a site after crops have been raised and harvested. Substantially all the top soil is shaken out by known means and then added to the secondary compost. The addition of the ash allows the secondary compost to have less water content. Additionally, the ash component contain phosphorous and potassium. In this embodiment the components of the secondary compost are: 1) compost 40-60%; 2) lime component 15-25%; 3) phosphorous component 5-10%; 4) the potassium component 5-10%; 5) boron component 0.5-2%; 6) humate component 0.5-2%; and 7) ash component 10-20%.

Having thus described the invention in connection with the several embodiments thereof, it will be evident to those skilled in the art that various revisions can be made to the several embodiments described herein with out departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. A method for producing a pelletized compost, comprising the steps of:
   curing and drying an organic waste to form a base compost;
   adding secondary materials to the base compost to form a secondary compost;
   lubricating the secondary compost;
   pelletizing the lubricated secondary compost;
   heating the pelletized secondary compost;
   wherein the heating step destroys a greater percentage of anaerobic bacteria in the secondary compost than aerobic bacteria in the secondary compost.

2. The method of claim 1, wherein:
   the heating of the secondary compost is done by a microwave oven.

3. The method of claim 2, wherein:
   the secondary materials include lime.

4. The method of claim 3, wherein:
   the secondary materials include boron.

5. The method of claim 4, wherein:
   the secondary materials include calphos.

6. A method for producing a pelletized compost, comprising the steps of:
   curing and drying an organic waste to form a base compost;
   adding secondary materials to the base compost to form a secondary compost;
   hammer milling the secondary compost;
   lubricating the hammer milled secondary compost;
   pelletizing the lubricated secondary compost;
   microwaving the pelletized secondary compost;
   wherein the microwaving step destroys a greater percentage of anaerobic bacteria in the secondary compost than aerobic bacteria in the secondary compost.

7. The method of claim 6, wherein:
   the secondary compost is lubricated by an organic oil.

8. The method of claim 7, wherein:
   the secondary materials include lime.

9. The method of claim 8, wherein:
   the secondary materials include boron.

10. The method of claim 9, wherein:
    the secondary materials include calphos.

11. The method of claim 10, wherein:
    the secondary materials include sulfate of pot ash.

12. The method of claim 6, wherein:
    the secondary compost is microwaved to achieve a temperature between 180 and 210 degrees Fahrenheit.

13. The method of claim 12, wherein:
    the lime is approximately 20% of the weight of the secondary compost.

14. The method of claim 13, wherein:
    the secondary materials also include an ash product.

15. The method of claim 13, wherein:
    the lime has an approximate effective calcium carbonate equivalent between 1510 and 1580.

16. The method of claim 15, wherein:
    the initial compost comprises at least 50% of the secondary compost.

* * * * *